(12) United States Patent
Kurtz et al.

(10) Patent No.: US 7,201,067 B2
(45) Date of Patent: Apr. 10, 2007

(54) SYSTEM AND METHOD FOR DETERMINING FLOW CHARACTERISTICS

(75) Inventors: Anthony D. Kurtz, Saddle River, NJ (US); Tonghuo Shang, East Lyme, CT (US); Louis DeRosa, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/009,561

(22) Filed: Dec. 10, 2004

(65) Prior Publication Data

US 2006/0060001 A1 Mar. 23, 2006

Related U.S. Application Data

(60) Provisional application No. 60/611,938, filed on Sep. 22, 2004.

(51) Int. Cl.
*G01F 1/46* (2006.01)

(52) U.S. Cl. .................................. 73/861.65
(58) Field of Classification Search ............... 73/866.5, 73/861.65, 861.66

See application file for complete search history.

(56) References Cited

U.S. PATENT DOCUMENTS

| | | | | |
|---|---|---|---|---|
| 3,355,946 A | * | 12/1967 | Lazell ..................... | 73/861.65 |
| 3,646,811 A | * | 3/1972 | DeLeo et al. ............ | 73/861.65 |
| 4,182,188 A | * | 1/1980 | Britton et al. ................ | 73/721 |
| 4,624,146 A | * | 11/1986 | Nakagawa ............... | 73/861.66 |
| 4,730,487 A | * | 3/1988 | DeLeo et al. ............ | 73/861.65 |
| 4,833,917 A | * | 5/1989 | Wilson .................... | 73/861.65 |
| 4,957,007 A | * | 9/1990 | Gray ........................ | 73/861.65 |
| 5,616,861 A | * | 4/1997 | Hagen ..................... | 73/861.66 |

* cited by examiner

*Primary Examiner*—Harshad Patel
(74) *Attorney, Agent, or Firm*—Plevy, Howard & Darcy, PC

(57) ABSTRACT

A fluid flow probe including: first, second and third pressure sensors; a first port for communicating a first pressure to the first pressure sensor; a second port for communicating a second pressure to the second pressure sensor, the second port being substantially oppositely disposed with respect to the first port, a third pressure port suitable for communicating a static pressure to the third pressure sensor; first and second outputs electrically coupled to the first and second pressure sensors, respectively, one of the first and second outputs indicative of a total pressure and the other of the outputs indicative of a base pressure; and, a third output electrically coupled to the third pressure sensor and indicative of the static pressure.

20 Claims, 1 Drawing Sheet

SYSTEM AND METHOD FOR DETERMINING FLOW CHARACTERISTICS

RELATED APPLICATION

This application claims priority of U.S. Patent Application Ser. No. 60/611,938, entitled PRESSURE MEASUREMENT PROBE, filed Sep. 22, 2004, the entire disclosure of which is hereby incorporated by reference as if being set forth in its entirety herein.

FIELD OF THE INVENTION

The present invention relates to measurement systems and methods for determining flow characteristics.

BACKGROUND OF THE INVENTION

In aircraft engines, and other machinery as well, it often occurs that the flow direction of a particular media, such as a fluid like a gas or a liquid, changes or even reverses during device operation. This is particularly the case when the flow is unsteady. It is desirable in certain applications to know the direction and/or the speed of media flow.

SUMMARY OF THE INVENTION

A fluid flow probe including: first, second and third pressure sensors; a first port for communicating a first pressure to the first pressure sensor; a second port for communicating a second pressure to the second pressure sensor, the second port being substantially oppositely disposed with respect to the first port, a third pressure port suitable for communicating a static pressure to the third pressure sensor; first and second outputs electrically coupled to the first and second pressure sensors, respectively, one of the first and second outputs indicative of a total pressure and the other of the outputs indicative of a base pressure; and, a third output electrically coupled to the third pressure sensor and indicative of the static pressure.

BRIEF DESCRIPTION OF THE FIGURES

Understanding of the present invention will be facilitated by considering the following detailed description of the preferred embodiments of the present invention taken in conjunction with the accompanying drawings, in which like numerals refer to like parts, and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical flow and pressure sensing systems and methods of making and using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

According to an aspect of the present invention there is provided a pressure measurement probe well suited to measure flow direction, as well as flow speed in a steady or unsteady environment. "Flow", as used herein, refers generally to the act of a fluid moving or running with substantially unbroken continuity—be it substantially uni- or multi-directional. "Fluid", as used herein, refers generally to an amorphous substance whose molecules move substantially freely past one another; such as a liquid or gas.

Figure 1:
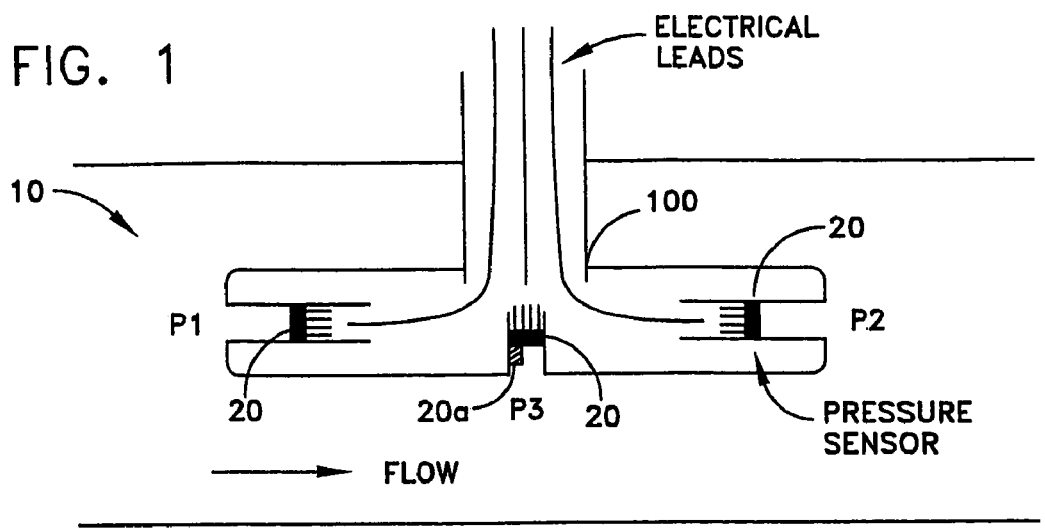
FIG. 1 illustrates a system according to an aspect of the present invention.

A system 10 as illustrated in FIG. 1, is well suited to measure flow direction and speed simultaneously. System 10 includes a probe 100 that continues to function even in the presence of flow reversal, for example.

Generally, probe 100 includes three pressure sensing ports: P1, P2 and P3. "Port", as used herein, generally refers to an opening, such as an opening in a fluid containing body, such as a cylinder or valve face. A port may or may not allow for passage of the fluid. A port may simply allow a physical sensor to be subjected to one or more characteristics of the media being measured, such as temperature and pressure, for example.

The pressure at each port may be measured with suitable pressure sensing apparatus 20, such as a commercially available Kulite IS leadless piezoresistive silicon on oxide pressure sensor model numbers XCQ- or XT-. By way of further non-limiting example, a sensor such as that described in U.S. Pat. No. 6,058,782, entitled "HERMETICALLY SEALED ULTRA HIGH TEMPERATURE SILICON CARBIDE PRESSURE TRANSDUCERS AND METHOD FOR FABRICATING SAME", the entire disclosure of which is hereby incorporated by reference herein, may be used.

According to an aspect of the present invention, a temperature sensor 20a may be incorporated with one or more of the pressure sensors, or provided separately. In either case, the temperature sensor may take the form of a thermally sensitive, resistive device, for example.

Figure 2:
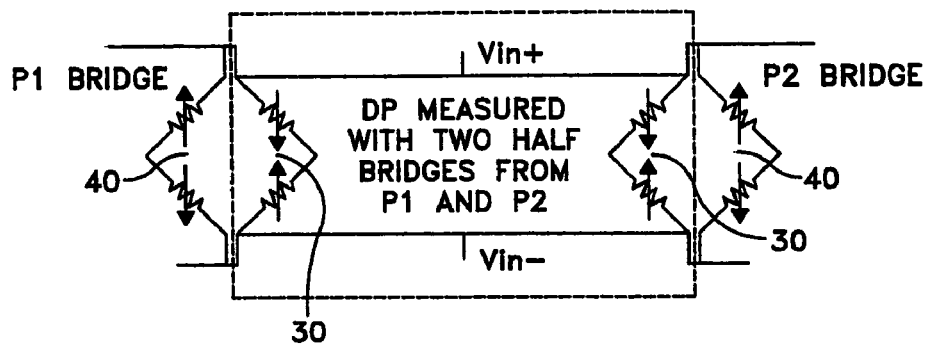
FIG. 2 illustrates a diagram of an electrical circuit representation of a system according to an aspect of the present invention; and, FIG. 3 illustrates a system according to an aspect of the present invention.

Referring now also to FIG. 2, two of the sensors 20 may each employ two fully open independent half bridges 30 which are exposed to sensing ports P1 and P2, while a third full bridge sensor measures the input from the sensing port P3. A bridge utilized may take the form of a Wheatstone bridge configuration of a plurality of piezoresistive elements, or gauges, some or all of which may be formed on a deflectable diaphragm, by way of non-limiting example only. A Wheatstone bridge is a well-known circuit configuration for measuring electrical resistances. As the diaphragm upon which individual piezoresistors are positioned deflects in response to an applied pressure, the output of the bridge, when excited, is proportional to the applied pressure. By way of further non-limiting example only, the operation of such a device may be broken down into three separate and simultaneously occurring phenomena. First, the diaphragm of the device converts the applied pressure into both surface and normal stresses. Second, the resistances of the piezoresistive elements are modified by these stresses. And third, the resistance changes of the piezoresistive elements are converted into a single voltage change by the Wheatstone bridge circuit. As will be appreciated by those possessing an ordinary skill in the pertinent arts, other types of configurations and sensors may be used.

As set forth, the sensors associated with ports P1 and P2 may take the form of open, half Wheatstone bridges.

Accordingly, the separate branches of these sensors may be used in combination in a full-bridge configuration, or separately as half-bridge configurations. In such an embodiment, one may interconnect a half bridge 30 from the sensor associated with port P1 and another from the sensor associated with port P2 to measure a pressure difference ($\Delta P$). The other half-bridge 40 from each of these sensors may be coupled with completion resistors, for example, to provide outputs indicative of the independent pressures sensed at ports P1 and P2, respectively. These completion resistors may optionally be used to measure temperature when not being used to measure pressure. Alternatively, separate thermally sensitive and resistive elements may be provided.

According to an aspect of the present invention, probe 10 may include four electrical outputs. In addition to outputs indicative of the absolute pressures sensed at ports P1, P2 and P3, probe 10 may provide an output indicative of the differential pressure $\Delta P$ (e.g., =P1−P2), using half bridges 30 from the sensors associated with ports P1 and P2.

When the flow is in a first direction (from left to right in the illustrated case of FIG. 1), the pressure port facing upstream measures total pressure ($P_{total}$=P1 pressure); whereas the pressure port facing downstream measures the downstream pressure ($P_{base}$=P2 pressure). The pressure sensed at the downstream port is often called the base pressure. The base pressure is slightly lower than the static pressure ($P_{static}$) sensed at port P3, which is again lower than the total pressure P1. The differential pressure $\Delta P$=P1−P2 is positive when the flow is from left to right, and negative when the flow is from right to left. Therefore $\Delta P$ is an indicator of flow direction. Outputs from the first and second pressure sensors may thus be selectively provided as the total pressure and/or base pressure, dependently upon flow direction.

Flow speed may be calculated from the differential and static pressure ($\Delta P$, $P_{static}$) measurements. For example, for incompressible fluid flows, such as air flows below about 200 mph, an approach consistent with Bernoulli's law may be used. By way of further example, the following equation:

$$P_{static} + \frac{\rho v^2}{2} = P_{total},$$

where $\rho$ is the density of the fluid and $v$ is the velocity of the fluid, may be used. For an ideal incompressible gas it may be assumed:

$$\rho = \frac{P_{static} M}{RT},$$

where M is the molecular mass of the fluid, T is the temperature of the fluid and R is the universal gas constant or 8.3143 joules per kelvin per mole. Thus, substituting for $\rho$, the velocity of the fluid flow may be determined as a function of temperature, molecular mass (which for air may be around 28.97) and differential and static pressures using the equation:

$$v = \sqrt{\frac{2RT}{M} \frac{\Delta P}{P_{static}}}.$$

At higher speeds, or where the compressibility of the fluid is to be accounted for, the following equation may be used:

$$v = \sqrt{\frac{2\gamma RT}{M(\gamma-1)}\left[\left(\frac{\Delta P + P_{static}}{P_{static}}\right)^{\frac{\gamma-1}{\gamma}} - 1\right]},$$

where $\gamma$ is the ratio of the specific heat of the fluid at constant pressure to the specific heat of the fluid at constant volume (about 1.4 for air). Thus, flow speed may still be found from the measured static pressure, differential pressure and temperature.

Depending on the flow direction as indicated by the equation $\Delta P = P_{total} - P_{base}$, either port P1 or P2 may be used as the total pressure port. The selection of total pressure and calculation of flow speed can be accomplished using integrated electrical circuits, separate from or as an integral part of the probe. Alternatively, a microprocessor and suitable instructions, e.g., computer code, stored in memory may be used, by way of further non-limiting example only.

With the high frequency response of integrated silicon sensor devices, such as those commercial devices presently available from Kulite Semiconductor Products, Inc., for example, probe 10 may also be used to determine if the flow is laminar or turbulent. Pressure measurements at P1, P2 and P3, as illustrated in FIG. 1, will be unsteady for turbulent flows. The frequency and length scale of turbulence may be determined from the unsteady pressure measurements and the relative position of pressure ports P1, P2 and P3, for example.

Figure 3:
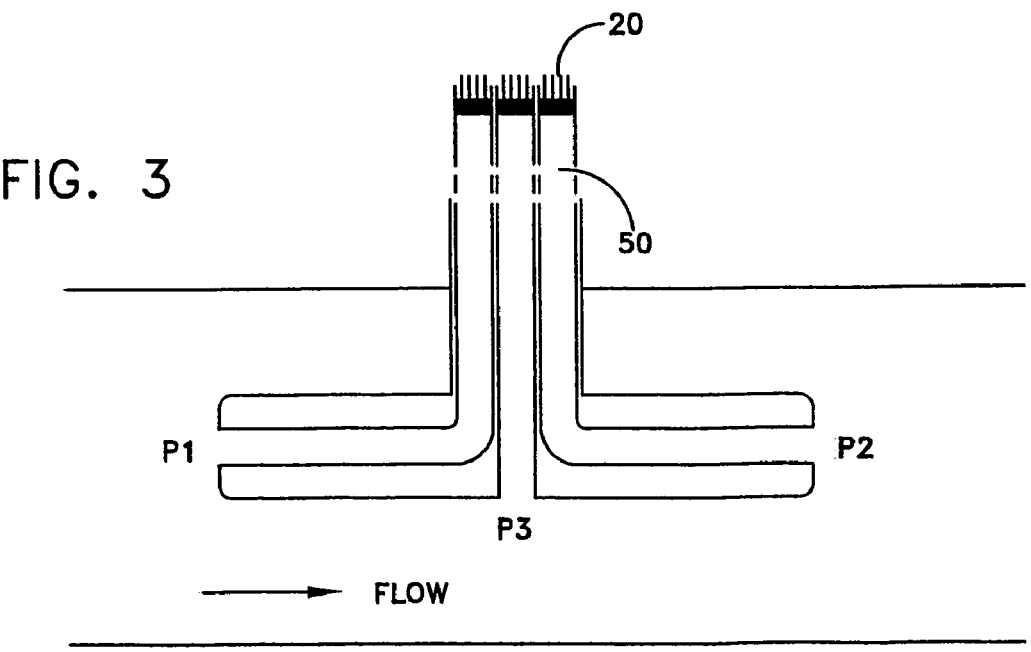

If measurement of unsteady pressures is not desired, semi-infinite tubes can be used between the pressure ports P1, P2 and P3 and the corresponding pressure sensors, as illustrated in FIG. 3. As will be understood by those possessing an ordinary skill in the pertinent arts, each semi-infinite tube 50 will act as a low pass filter with a cutoff frequency of C/4L, where C is the speed of sound in the fluid media and L is the tube length.

Those of ordinary skill in the art may recognize that many modifications and variations of the present invention may be implemented without departing from the spirit or scope of the invention. Thus, it is intended that the present invention covers the modifications and variations of this invention.

What is claimed is:

1. A fluid flow probe comprising:
   first, second and third pressure sensors;
   a first port for communicating a first pressure to said first pressure sensor;
   a second port for communicating a second pressure to said second pressure sensor, said second port being substantially oppositely disposed with respect to said first port,
   a third pressure port suitable for communicating a static pressure to said third pressure sensor;
   first and second outputs electrically coupled to said first and second pressure sensors, respectively, one of said first and second outputs indicative of a total pressure and the other of said first and second outputs indicative of a base pressure; and, a third output electrically coupled to said third pressure sensor and indicative of the static pressure.

2. The probe of claim 1, further comprising means for determining a flow direction dependently upon said first and second outputs.

3. The probe of claim 1, further comprising an integrated circuit that selects the higher of said first and second outputs as the total pressure.

4. The probe of claim 1, further comprising a microprocessor and code for selecting the higher of said first and second outputs as the total pressure.

5. The probe of claim 1, wherein said first and second pressure sensors each comprise a plurality of piezoresistors configured in half Wheatstone bridge configurations.

6. The probe of claim 5, wherein a half bridge from said first sensor is coupled to a half-bridge from said second sensor.

7. The probe of claim 1, further comprising an output indicative of a differential pressure and being coupled to said first and second sensors.

8. The probe of claim 7, further comprising a temperature sensor.

9. The probe of claim 8, further comprising an integrated circuit for determining flow velocity dependently upon temperature, said static pressure and said differential pressure.

10. The probe of claim 9, further comprising an integrated circuit for determining whether said flow is turbulent.

11. The probe of claim 10, wherein said integrated circuit for determining whether said flow is turbulent comprises an integrated circuit for determining a rate of change of said flow.

12. The probe of claim 8, further comprising code for determining flow velocity dependently upon temperature, said static pressure and said differential pressure.

13. The probe of claim 12, further comprising code for determining whether said flow is turbulent.

14. The probe of claim 13, wherein said code for determining whether said flow is turbulent comprises code for determining a rate of change of said flow.

15. The probe of claim 1, further comprising a plurality of tubes coupling said ports to said pressure sensors, respectively.

16. The probe of claim 15, wherein each of said tubes is sufficiently long to low pass filter changes in flow.

17. A method for determining at least one flow characteristic of a fluid comprising:

measuring a first absolute pressure in a first direction;

measuring a second absolute pressure in a second direction substantially oppositely from said first direction;

measuring a static pressure distinct from said first and second absolute pressures; and, measuring a differential pressure between said first and second directions substantially simultaneously with said first and second absolute pressure measurements.

18. The method of claim 17, further comprising comparing said first pressure to said second pressure to determine flow direction.

19. The method of claim 17, further comprising measuring a temperature.

20. The method of claim 19, further comprising determining flow velocity dependently upon said measured temperature, static pressure and differential pressure.

* * * * *